(12) United States Patent
Hamers et al.

(10) Patent No.: US 10,774,896 B2
(45) Date of Patent: Sep. 15, 2020

(54) METHOD FOR OPERATING A CONTROLLABLE SHOCK ABSORBER FOR MOTOR VEHICLES

(71) Applicants: ThyssenKrupp Bilstein GmbH, Ennepetal (DE); ThyssenKrupp AG, Essen (DE)

(72) Inventors: Wolfgang Hamers, Jülich (DE); Tobias Lenz, Nümbrecht (DE)

(73) Assignees: THYSSENKRUPP BILSTEIN GMBH, Ennepetal (DE); THYSSENKRUPP AG, Essen (DE)

(*) Notice: Subject to any disclaimer, the term of this patent is extended or adjusted under 35 U.S.C. 154(b) by 0 days.

(21) Appl. No.: 15/521,651

(22) PCT Filed: Sep. 11, 2015

(86) PCT No.: PCT/EP2015/070795
§ 371 (c)(1),
(2) Date: Apr. 25, 2017

(87) PCT Pub. No.: WO2016/066314
PCT Pub. Date: May 6, 2016

(65) Prior Publication Data
US 2017/0234396 A1    Aug. 17, 2017

(30) Foreign Application Priority Data
Oct. 27, 2014    (DE) .................. 10 2014 115 577

(51) Int. Cl.
*F16F 9/46* (2006.01)
*F16F 9/34* (2006.01)
*F16F 9/348* (2006.01)

(52) U.S. Cl.
CPC ............ *F16F 9/465* (2013.01); *F16F 9/3405* (2013.01); *F16F 9/3481* (2013.01); *F16F 9/3484* (2013.01)

(58) Field of Classification Search
CPC .. F16F 9/465; F16F 9/34; F16F 9/3405; F16F 9/3481; F16F 9/3484
See application file for complete search history.

(56) References Cited

U.S. PATENT DOCUMENTS 4,953,671 A * 9/1990 Imaizumi ................ F16F 9/464
                                                    188/266.3
5,823,306 A * 10/1998 de Molina ................ F16F 9/34
                                                    188/322.15

(Continued)

FOREIGN PATENT DOCUMENTS

CN      101290036 A    10/2008
DE         4404835 A     8/1995

(Continued)

OTHER PUBLICATIONS

Int'l Search Report for PCT/EP2015/070795 dated Nov. 23, 2015 (dated Dec. 1, 2015).

(Continued)

*Primary Examiner* — Bradley T King
*Assistant Examiner* — James K Hsiao
(74) *Attorney, Agent, or Firm* — thyssenkrupp North America, LLC

(57) ABSTRACT

A method for operating a controllable shock absorber may involve damping movement of a valve body by loading the valve body with a back pressure on an outflow side. Further, the controllable shock absorber may include a cylinder tube, a piston within the cylinder tube that divides the cylinder tube into two working spaces and includes a couple fluid leadthroughs connecting the working spaces, and first and second valve assemblies for damping piston movement in (Continued)

first and second actuating directions that are disposed on the leadthroughs. Each valve assembly may have a pilot control chamber and a valve plate that is either seated on or spaced apart from a valve seat in closed and open valve positions. Each valve plate can be prestressed closed by pressure loading the pilot control chamber. The pressures of the pilot control chambers can be set by a pilot control valve that comprises a movable valve body. As a result, an outflow cross section between the pilot control chambers and the working spaces can be set. The valve body may be loaded on an outflow side with a back pressure, as a result of which movement of the valve body is damped.

10 Claims, 3 Drawing Sheets

(56) References Cited

U.S. PATENT DOCUMENTS

| | | | |
|---|---|---|---|
| 6,371,262 | B1 | 4/2002 | Katou et al. |
| 7,694,785 | B2 * | 4/2010 | Nakadate ............ F16F 9/3484 |
| | | | 188/266.5 |
| 7,997,394 | B2 | 8/2011 | Yamaguchi |
| 9,249,854 | B2 * | 2/2016 | Kim .................... F16F 9/3485 |
| 2001/0010279 | A1 * | 8/2001 | Matsumoto ............ F16F 9/46 |
| | | | 188/280 |
| 2002/0000352 | A1 | 1/2002 | Matsumoto et al. |
| 2003/0098209 | A1 * | 5/2003 | Nakadate ............ F16F 9/3485 |
| | | | 188/282.5 |
| 2005/0279597 | A1 * | 12/2005 | Yamaguchi ............ F16F 9/348 |
| | | | 188/322.13 |
| 2008/0257668 | A1 * | 10/2008 | Yamaguchi .......... F16F 9/3485 |
| | | | 188/285 |
| 2012/0097493 | A1 * | 4/2012 | Ewers .................. F16F 9/3405 |
| | | | 188/322.13 |
| 2013/0299291 | A1 * | 11/2013 | Ewers .................. F16F 9/3488 |
| | | | 188/322.13 |

FOREIGN PATENT DOCUMENTS

| | | |
|---|---|---|
| DE | 44 41 047 C1 | 1/1996 |
| DE | 100 20 778 B4 | 1/2001 |
| DE | 101 26 555 C2 | 1/2002 |
| DE | 101 04 640 C1 | 5/2002 |
| EP | 2 444 688 A1 | 4/2012 |
| WO | 2010/122102 A1 | 10/2010 |

OTHER PUBLICATIONS

English language Abstract for DE 44 41 047 C1 listed above.
English language Abstract for DE 101 04 640 C1 listed above.

* cited by examiner

METHOD FOR OPERATING A CONTROLLABLE SHOCK ABSORBER FOR MOTOR VEHICLES

CROSS REFERENCE TO RELATED APPLICATIONS

This application is a U.S. National Stage Entry of International Patent Application Serial Number PCT/EP2015/070795, filed Sep. 11, 2015, which claims priority to German Patent Application No. 10 2014 115 577.7 filed Oct. 27, 2014, the entire contents of both of which are incorporated herein by reference.

FIELD

The present disclosure generally relates to shock absorbers, including methods for operating controllable shock absorbers.

BACKGROUND

A corresponding shock absorber is known from DE 44 41 047 C1. Pressure-dependent damping valves for an exchange of fluid in the rebound and compression stage between two working spaces are provided on a piston which is guided axially within a cylinder tube. A pilot control means acts in such a way that a controllable pressure is built up in pilot control chambers. The pilot control pressure loads the valve plates of the damping valves into their closed position. By way of a bypass duct system, fluid is guided out of the working spaces into the pilot control chambers and the pressure is thus increased there. The pilot control pressure is regulated with the aid of a pilot control valve which can be set externally and is arranged in the bypass duct system. An elastic element forms the separating means between the pilot control chamber and the working space.

A further shock absorber which operates according to the same principle is known from DE 101 04 640 C1. In said document, the pilot control chambers are formed by way of pressure spaces. Said pressure spaces are formed by way of in each case one pressure space housing and one seal which lies movably on a damping valve. A pilot control valve controls the pressure in the pilot control chambers. An outlet of the pilot control valve opens into the working spaces.

U.S. Pat. No. 7,694,785 B2 discloses a similar application. The pressure in the pilot control chambers is likewise regulated via a pilot control valve. An outlet of the pilot control valve opens in each case into the respectively non-active pilot control chamber. This results, however, in an interaction between the function of the pilot control valve and the pressure in the non-active pilot control chamber, which interaction causes undesired side effects.

DE 101 26 555 C2 discloses a further arrangement, in which the pilot control valve likewise opens into the working spaces. A check valve prevents a direct inflow from the working spaces in the direction of the pilot control valve.

DE 100 20 778 B4 discloses a further shock absorber, in which, although it operates fundamentally according to the fundamental principle of DE 44 41 047 C1, a separate disk valve is provided here for each pilot control chamber for the regulation of the pilot control pressure. The two pilot control chambers are arranged in separate pilot control circuits and are therefore not connected to one another via a common fluidic connection. Furthermore, the damping valves are loaded into the closed position via a sliding element. A separate disk spring is in turn provided per sliding element, which disk spring loads the sliding element in the direction of the damping valve.

The pilot control pressures are changed at very short intervals. This is the case, above all, in shock absorbers of the type, in which the pilot control pressure is set in both pilot control chambers by way of merely one single pilot control valve. When driving over an uneven roadway (for example, cobblestones), the shock absorber can change between the rebound and the compression stage approximately between 10 and 20 times per second; the pilot control valve likewise correspondingly oscillates at a frequency of from approximately 10 to 20 Hz, in order to set the desired pilot control pressure for each stage. Said relatively high frequency oscillation generates instabilities in the form of high frequency harmonics in the profile of the damping force. This problem has not been noted up to now in the case of shock absorbers which have hydraulically separated pilot control circuits, as disclosed, for example, in DE 100 20 778 B4.

DETAILED DESCRIPTION

Figure 1:
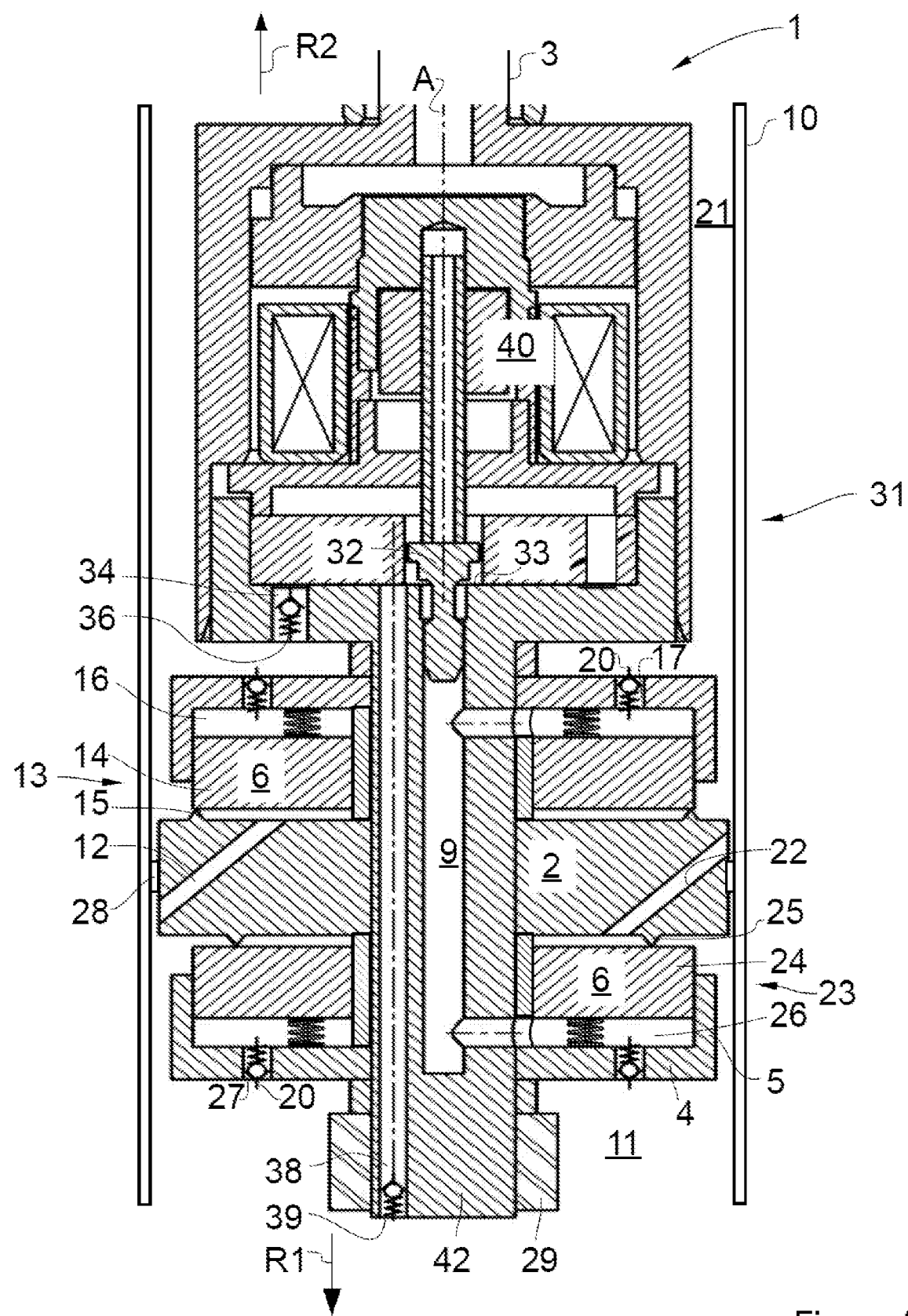
FIG. 1 is a cross-sectional view of a prior art shock absorber with a valve assembly.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a method for operating a controllable shock absorber, in which method the addressed instabilities are avoided.

According to the invention, a method for operating a controllable shock absorber, in particular for a vehicle chassis, is thus proposed. A shock absorber of this type comprises a cylinder tube which has a hydraulic fluid which is received therein in a sealed manner, a piston which can be moved axially along a cylinder tube axis within the cylinder tube and which divides the cylinder tube into two working spaces, a piston rod which is oriented parallel to the cylinder tube axis and is connected at one end to the piston. At least two fluid leadthroughs are provided in the piston, by way of which fluid leadthroughs the one working space is connected to the other working space, a first valve assembly for damping the piston movement in a first actuating direction being arranged on a first fluid leadthrough, and a second valve assembly for damping the piston movement in a second actuating direction being arranged on a second fluid leadthrough, each valve assembly having at least one valve plate which is seated on a valve seat in a closed valve position and which is spaced apart at least partially from the valve seat in an open valve position. Each valve assembly comprises a pilot control chamber, it being possible for the respective valve plate to be prestressed into the closed valve position by way of pressure loading of the pilot control chamber, it being possible for the pressure in the respective pilot control chambers to be set by way of at least one pilot control valve, the pilot control valve comprising a valve body which can be moved in a defined manner between a closed position and an open position, as a result of which an outflow cross section between the pilot control chambers and the working spaces can be set in a targeted manner. The method according to the invention is distinguished by the fact that the valve body is loaded on the outflow side with a back pressure in a defined manner, as a result of which the movement of the valve body is damped.

The loading of the valve body on the outflow side with a back pressure brings about hydraulic clamping of the valve body, as a result of which the movement of the valve body is stabilized. This thus results overall in a considerably more stable damping force profile of the shock absorber.

Furthermore, the invention relates to a controllable shock absorber of the type mentioned at the outset. The shock absorber is distinguished by the fact that an outflow valve is arranged so as to be mounted downstream of the valve body in the outflow direction, by way of which outflow valve a back pressure which acts on the valve body on the outflow side can be built up. This results in the advantages which are mentioned with regard to the method.

The invention can be used, in particular, in a shock absorber of the type which comprises exactly one valve body for setting the pilot control pressure in both pilot control chambers, and the position of which is set in a targeted manner during operation with the aid of an actuator. The valve body in shock absorbers of this type is subject to very high oscillations which lead to harmonics in the damping force profile of the shock absorber. Here, in particular, the same outflow valve is connected on the outflow side both to the first pilot control chamber and to the second pilot control chamber.

The valve body is preferably adjoined on the outflow side by a first and a second outflow path, the first outflow path being closed by way of the valve body when an actuator for actuating the position of the valve body is inactive. The first outflow path is then closed by the valve body in a failsafe state (for example, failure of the power supply of the actuator). The fluid is then forced to flow through the other, second outflow path. A failsafe characteristic can then be set in said second path by way of a targeted throttle device.

It is preferred here that the outflow valve adjoins the first and the second outflow path on the outflow side. The outflow valve itself can therefore form a device which at least influences the failsafe characteristic. The number of required parts can thus be reduced.

A check valve is preferably arranged between the valve body and the outflow valve, which check valve prevents a return flow of hydraulic fluid from the first outflow path in the direction of the valve body through the second outflow path. Here, the outflow valve and the check valve are preferably formed by way of disks which are arranged on a common journal so as to be axially adjacent to one another.

This makes a very space-saving arrangement possible. The journal centers the circular disk-shaped valve plates.

The outflow valve is, in particular, a passive pressure limiting valve, comprising one or more prestressed valve plates.

Furthermore, the arrangement can be of very space-saving configuration if the valve body is arranged in a radially inner recess of said journal.

FIG. 1 shows the section of a conventional shock absorber 1.

The shock absorber 1 comprises a cylinder tube 10, in which a piston 2 is held such that it can be displaced along a cylinder tube axis A. The piston 2 has an annular seal or a piston band 28 on its outer circumference, with the result that the piston 2 divides the cylinder tube 10 sealingly into a first working space 11 (remote from the piston rod) and into a second (piston rod-side) working space 21. The piston 2 is fastened to a fastening pin 42 which in turn is connected fixedly to a piston rod 3. Upon actuation of the piston rod 3 in a first actuating direction R1 toward the first working space 11 (also called "compression direction"), the pressure increases in the first working space 11. Fluid which is present in the first working space 11 then flows through a first fluid leadthrough 12 in the piston 2 into the second working space 21. Here, the fluid flows through the first fluid leadthrough 12 and through a first valve assembly 13 with a pressure limiting valve 14. The pressure limiting valve 14 can be formed, for example, from one or more flexible valve plates 14. When a minimum pressure of the fluid is reached in the first working space 11, the first pressure limiting valve 14 which is seated with prestress on a first valve seat 15 is released at least partially from the first valve seat 15. The valve plate 14 is thus transferred from the closed position into the open position, in which it is lifted up from the valve seat. A hydraulic connection is thus established between the first working space 11 and the second working space 21. Here, the first pressure limiting valve 14 generates the damping force in interaction with the first valve seat 15.

The pressure limiting valve 14 is loaded in the direction of the valve seat 15 by way of a pressure ("pilot control pressure" in the following text) which prevails in a first pilot control chamber 16. Said pilot control pressure in the first pilot control chamber 16 can be set in a defined manner during operation. It can be seen that the opening pressure of the pressure limiting valve 14 is higher, the higher the pilot control pressure is in the first pilot control chamber 16. Therefore, the pilot control pressure influences the characteristic curve profile of the damping force in the p-v diagram.

Furthermore, the shock absorber 1 comprises a second valve assembly 23 which is of analogous configuration to the first valve assembly 13. The second valve assembly is provided for the purpose of braking the flow of the fluid when the piston 2 is moved in a second actuating direction R2 (also called "rebound direction"). In this case, the fluid flows from the second working space 21 via a second fluid leadthrough 22 into the first working space 11. The second valve plate 24 is loaded in the direction of the valve seat 25 by way of a pilot control pressure which prevails in a second pilot control chamber 26. The second valve plate 24 and a second valve seat 25 are configured analogously with respect to the corresponding components of the first valve assembly 13.

The two pilot control chambers 16, 26 are connected to one another hydraulically via a connecting leadthrough 9. The connecting leadthrough 9 comprises an axial bore in the fastening pin 42 and two radial connecting bores in the fastening pin 42, which radial connecting bores connect the axial bore in each case to one of the pilot control chambers 16, 26. The same pressure always prevails substantially in both pilot control chambers 16, 26. If the piston 2 is then moved in the first actuating direction R1, the pressure increases in the first working space 11 and the damping fluid flows through a fluid leadthrough 27 between the first working space 11 and the second pilot control chamber 26 out of the first working space 11 into the second pilot control chamber 26, as a result of which the pilot control pressure in the second pilot control chamber 26 is increased. The pilot control pressure which is built up in the second pilot control chamber 26 also propagates into the first pilot control chamber 16 through the connecting leadthrough 9. As a result, the pilot control pressure is generated in the first pilot control chamber 16, by way of which pilot control pressure the damping behavior of the first valve assembly 13 is influenced. The same applies to the actuation in the second actuating direction R2. In this case, the fluid flows from the second working space 21 by way of a fluid leadthrough 17 between the second working space 21 and the first pilot control chamber 16 into the first pilot control chamber 16. The pilot control pressure which is generated in this way in the first pilot control chamber 16 in turn propagates by way of the connecting leadthrough 9 into the second pilot control chamber 26. In order that the fluid cannot flow by way of the fluid leadthroughs 17, 27 from the first pilot control chamber 16 directly into the second working space 21 or from the second pilot control chamber 26 into the first working space 11, a one-way valve 20 is attached in each case in the fluid leadthroughs 17, 27, which one-way valves 20 are configured, for example, as check valves.

The pilot control pressure in the two pilot control chambers 16 and 26 can be regulated. To this end, a pilot control valve 31 is provided which has a valve body 32. The valve body is held such that it can be moved along the cylinder tube axis A, and can be seated on a stationary (in relation to the fastening pin) valve seat 33. When the valve body 32 is seated on the valve seat 33, an outflow of fluid by way of the pilot control valve 31 is largely prevented. During a phase of this type, the pilot control pressure can be built up or held. If the valve body 32 is released from the valve seat 33, fluid can flow out of the connecting leadthrough 9 by way of the pilot control valve 31; in this phase, the pilot control pressure can be reduced. Here, the valve body 32 is loaded in the first actuating direction R1 by means of a magnetic actuator 40. In addition, a spring can be provided which loads the valve body 32. The valve body 32 is loaded in the second actuating direction R2 by way of the pilot control pressure. Depending on the force conditions, due to the magnetic actuator 40 and the pilot control pressure, the result is then the position of the valve body 32 with respect to the valve seat 33.

The fluid which flows out by way of the pilot control valve 31 flows by way of a second outflow passage 34 to the second working space 21 upon actuation of the piston rod in a direction R1 (increased pressure in the first working space 11). A one-way valve 36 is arranged in the second outflow passage 34. In this case, the one-way valve 36 prevents it being possible for fluid to pass out of the second working space 21 by way of the pilot control valve 31 in the direction of the pilot control chambers 16, 26.

Upon actuation of the piston rod 3 in the direction R2 (increased pressure in the second working space 21), the fluid which flows out by way of the pilot control valve 31 flows by way of a first outflow passage 38 to the first working space 11. The first outflow passage 38 is formed by way of an axial bore in the fastening pin 42. A one-way valve 36 in the outflow passage 38 prevents fluid from passing out of the second working space 21 by way of the pilot control valve 31 in the direction of the pilot control chambers 16, 26.

Figure 2:
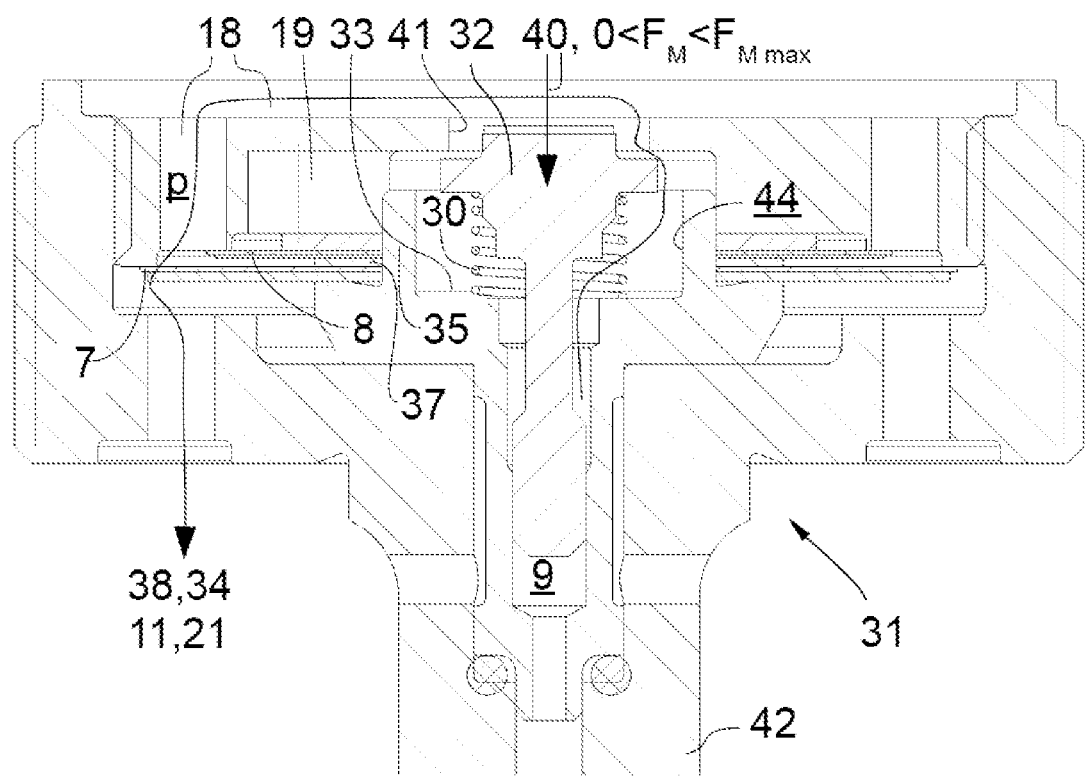
FIG. 2 is a cross-sectional view of an example pilot control valve of a shock absorber in a first operating state.
Figure 3:
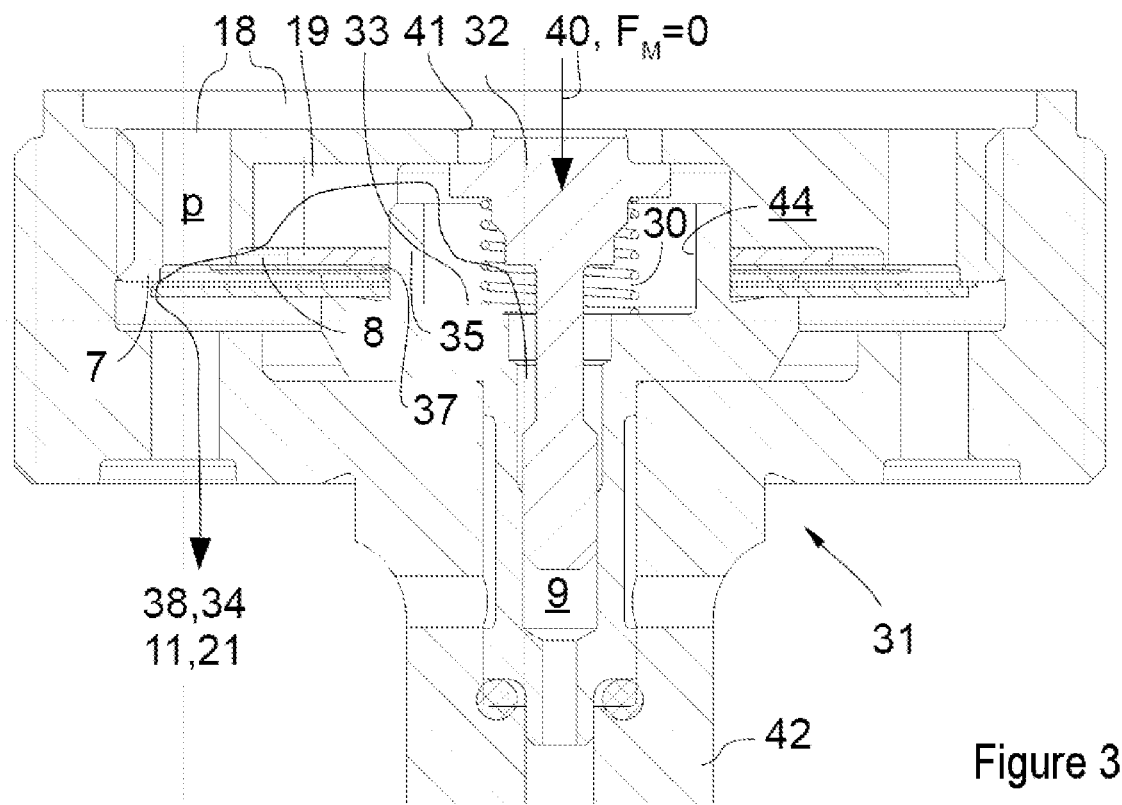
FIG. 3 is a cross-sectional view of an example pilot control valve of a shock absorber in a second operating state.

An arrangement as will be described in the following text using FIGS. 2 and 3 is then introduced according to the invention into a shock absorber of this type.

FIGS. 2 and 3 show a pilot control valve 31 of a shock absorber according to the invention which is of largely analogous configuration with respect to the embodiment in accordance with FIG. 1. The differences result from the following description.

Said pilot control valve 31 is in communication with the two pilot control chambers 16, 26 via the connecting leadthrough 9, in an analogous manner to the embodiment in accordance with FIG. 1. The connecting leadthrough 9 opens into a chamber 44, in which the valve body 32 is arranged. The latter can be moved parallel to the cylinder axis A and is loaded on one side by a spiral spring 30 and on the other side by way of the magnetic actuator 40 parallel to the cylinder axis A. In a first operating state, the regular operating state, the valve body 32 is held between an open and closed position by way of the magnetic force which can vary fundamentally between 0 and a maximum magnetic force $F_{M\ max}$. If the valve body 32 is spaced apart from the valve seat 33, fluid can flow out by way of a first outflow path 18 via the outflow passages 38, 34 into the working spaces 11 and 21, in a manner which corresponds to the embodiment in accordance with FIG. 1. If the valve body 32 lies on the valve seat 33, the valve body 32 is situated in the closed position; otherwise, the valve body 32 is situated in one of a plurality of possible open positions. In the closed position, the valve body 32 can lie on the valve seat 33 in a completely sealing manner, but it does not have to lie on the valve seat 33 in a completely sealing manner.

An outflow valve 7 in the form of a disk valve is provided in said first outflow path 18. The outflow valve 7 throttles the outflow via the first outflow path 18 and thus generates a back pressure p which in turn acts on the valve body 32 on the outflow side. As a result, the movement of the valve body 32 is clamped hydraulically between the pressure in the connecting leadthrough 9 and the back pressure p in the first outflow path 18, and the movement of said valve body 32 is damped. An outflow valve 7 of this type can fundamentally have a progressive, linear and/or degressive characteristic and can be adapted to the specific intended purpose of the shock absorber. The stability of the overall system is improved by way of the damping of the movement of the valve body 32.

Furthermore, the pilot control valve 31 has a failsafe function as a second operating state, which will be explained using FIG. 3. In the case of a defect of the magnetic actuator 40, the magnetic force $F_M$ is canceled. In this case, the spring 30 loads the valve body away from the valve seat 33. The valve body 32 then blocks an inlet opening 41 of the first outflow path 18. The outflow of the hydraulic fluid then takes place exclusively via a second outflow path 19, at the end of which a disk valve 8 is arranged. The disk valve 8 has both the function of a throttle and the function of a one-way valve. The failsafe behavior, that is to say the damping behavior which the shock absorber is to configure in the case of a power failure at the actuator, can be set in a defined manner in advance by way of the dimensioning of the disk valve 8. Here, the disk valve 8 generates a back pressure, as a result of which a certain pilot control pressure is maintained in the pilot control chambers in a manner which is dependent on the flow velocity of the fluid, even if the pilot control valve fails.

The result of the arrangement which is shown in FIGS. 2 and 3 is a very small installation space for the outflow valve and the failsafe arrangement which is additionally required for the second outflow path 19 and the disk valve 8. Here, both the outflow valve 7 and the disk valve 8 are formed by way of disk packets which are arranged axially adjacently with respect to one another and are centered by way of a common journal 35. A spacer sleeve 37 is arranged in between, which spacer sleeve 37 provides space for deflecting the valve plate 8 as a consequence of the pressure loading. A further saving of space requirements results from the fact that both the outflow valve 7 and the disk valve 8 are provided for the failsafe operation for both stages (compression stage and the rebound stage), that is to say for the outflow of the hydraulic fluid from both pilot control chambers. In addition, the valve body 32 is arranged in a space-saving manner in the chamber 44 which configures a radially inner recess of the journal 35. According to the invention, the valve body 32 is then braked by the back pressure which prevails on the outflow side, as a result of which the oscillations of said valve body 32 are damped.

Figure 4:
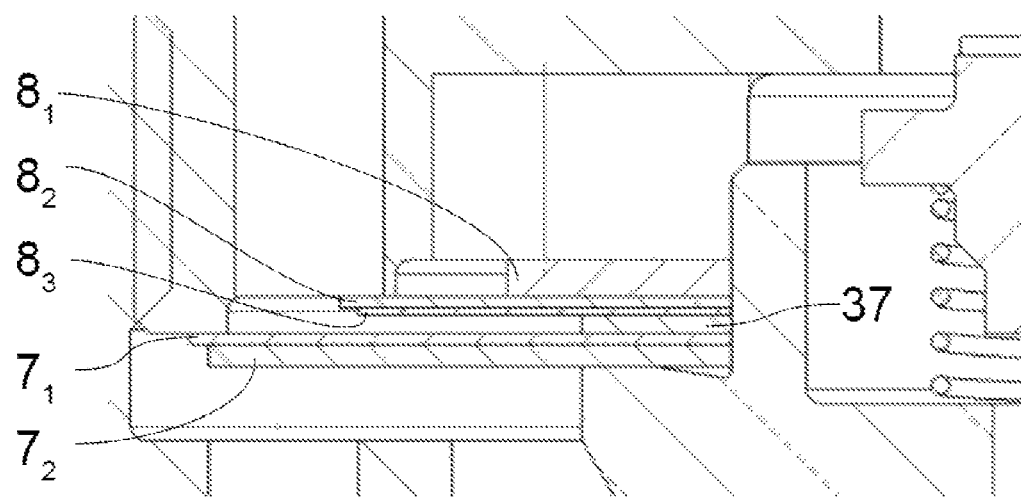
FIG. 4 is an enlarged detail view from FIG. 2 of plates of an outflow valve and a disk valve.

FIG. 4 shows an enlarged detail from FIG. 2 in the region of the plates of the outflow valve 7 and the disk valve 8. Here, the disk valve 8 is formed from a prestressing disk $8_1$, a throttle plate $8_2$ which adjoins it in the outflow direction, and a covering plate $8_3$ which loads it in the closing direction. This is adjoined by the sleeve 37 as a compensation washer. The outflow valve 7 comprises an outflow throttle plate $7_1$ and a covering plate $7_2$ which loads the outflow throttle plate $7_1$ into the closed position.

The throttle plate $8_2$ provides a constant opening cross section up to a certain pressure; above an opening pressure which can be set by way of the selection of the covering plate $8_3$, the throttle plate $8_2$ lifts up from the valve seat and the opening cross section is enlarged. This also applies correspondingly to the outflow valve 7. The outflow throttle plate $7_1$ provides a constant opening cross section up to a certain pressure; from an opening pressure which can be set by way of the selection of the covering plate $7_2$, the outflow throttle plate $7_1$ lifts up from a valve seat and the opening cross section is enlarged.

The outflow-side region is fundamentally understood to be that side of a component in the hydraulic path between the pilot control chamber 16, 26 and the working spaces 11, 21, which side faces away from the pilot control chamber 16, 26 and faces the working space 11, 21. The hydraulic fluid flows along the outflow direction from the pilot control chamber 16, 26 via the fluid leadthrough 9 to the valve body 32, and subsequently by way of one of the outflow paths 18, 19 to the outflow valve 7. It subsequently opens into one of the working spaces 11, 21.

LIST OF DESIGNATIONS

1 Shock absorber
2 Piston
3 Piston rod
6 Dimensionally stable movable cover
7 Outflow valve
$7_1$ Outflow throttle plate
$7_2$ Covering plate
8 Disk valve
$8_1$ Prestressing disk
$8_2$ Throttle plate
$8_3$ Covering plate
9 Connecting leadthrough between the two pilot control chambers
10 Cylinder tube
11 First working space
12 First fluid leadthrough
13 First valve assembly
14 First valve plate
15 First valve seat
16 First pilot control chamber
17 Connecting leadthrough between the second working space 21 and the first pilot control chamber 16
18 First outflow path
19 Second outflow path
20 One-way valve
21 Second working space
22 Second fluid leadthrough
23 Second valve assembly
24 Second valve plate
25 Second valve seat
26 Second pilot control chamber
27 Fluid leadthrough between the first working space 11 and the second pilot control chamber 26
28 Annular seal
29 Nut
30 Spring
31 Pilot control valve
32 Valve body
33 Valve seat
34 Second outflow passage to the second working space
35 Journal
36 One-way valve
37 Spacer sleeve
38 First outflow passage to the first working space
39 One-way valve
40 Magnetic actuator
41 Inlet opening of the first outflow path
42 Fastening pin
43 Valve seat
44 Chamber
A Cylinder tube axis
R Actuating direction
p Back pressure

What is claimed is:

1. A method for operating a controllable shock absorber, wherein the shock absorber comprises:
    a cylinder tube that contains a hydraulic fluid in a sealed manner;
    a piston that is movable axially along a cylinder tube axis within the cylinder tube, the piston dividing the cylinder tube into a first working space and a second working space, wherein the piston comprises a first fluid leadthrough and a second fluid leadthrough by way of which the first and second working spaces are connected;
    a piston rod disposed parallel to the cylinder tube axis and connected to the piston;
    a first valve assembly for damping piston movement in a first actuating direction disposed on the first fluid leadthrough;
    a second valve assembly for damping piston movement in a second actuating direction disposed on the second fluid leadthrough, wherein each of the first and second valve assemblies comprises:
        a pilot control chamber, and
        a valve plate that is seated on a valve seat in a closed valve position and that is spaced apart from the valve seat in an open valve position, wherein the valve plate can be prestressed into the closed valve position by pressure loading the pilot control chamber; and a pilot control valve configured to set pressures in the pilot control chambers, the pilot control valve comprising a valve body that is movable between a closed position and an open position, as a result of which an outflow cross-section between the pilot control chambers and the working spaces can be set, wherein the method comprises damping movement of the valve body by loading the valve body with a back pressure on an outflow side.

2. A controllable shock absorber comprising:

a cylinder tube that contains a hydraulic fluid in a sealed manner;

a piston that is movable axially along a cylinder tube axis within the cylinder tube, the piston dividing the cylinder tube into a first working space and a second working space, wherein the piston comprises a first fluid leadthrough and a second fluid leadthrough by way of which the first and second working spaces are connected;

a piston rod disposed parallel to the cylinder tube axis and connected to the piston;

a first valve assembly for damping piston movement in a first actuating direction disposed on the first fluid leadthrough;

a second valve assembly for damping piston movement in a second actuating direction disposed on the second fluid leadthrough, wherein each of the first and second valve assemblies comprises:

a pilot control chamber, and a valve plate that is seated on a valve seat in a closed valve position and that is spaced apart from the valve seat in an open valve position, wherein the valve plate can be prestressed into the closed valve position by pressure loading the pilot control chamber; and a pilot control valve configured to set pressures in the pilot control chambers, the pilot control valve comprising a valve body that is movable between a closed position and an open position, as a result of which an outflow cross-section between the pilot control chamber and the working spaces can be set, wherein the valve body is assigned an outflow valve on an outflow side by way of which a back pressure that acts on the valve body can be built up on the outflow side.

3. The controllable shock absorber of claim 2 wherein the outflow valve is connected on the outflow side to the pilot control chambers of the first and second valve assemblies.

4. The controllable shock absorber of claim 2 wherein the valve body is adjoined on the outflow side by a first outflow path and a second outflow path, wherein the first outflow path is closed by way of the valve body when an actuator for actuating a position of the valve body is inactive.

5. The controllable shock absorber of claim 4 wherein the outflow valve is connected on the outflow side to the first outflow path and to the second outflow path.

6. The controllable shock absorber of claim 4 further comprising a check valve disposed between the valve body and the outflow valve, wherein the check valve prevents a return flow of the hydraulic fluid from the first outflow path in a direction of the valve body through the second outflow path.

7. The controllable shock absorber of claim 6 wherein the outflow valve and the check valve comprise disks disposed on a common journal so as to be axially adjacent to one another.

8. The controllable shock absorber of claim 7 wherein the valve body is disposed in a radially inner recess of the common journal.

9. The controllable shock absorber of claim 2 wherein the valve body is disposed in a radially inner recess of a common journal.

10. The controllable shock absorber of claim 2 wherein loading the valve body with the back pressure on the outflow side dampens movement of the valve body.

* * * * *